UNITED STATES PATENT OFFICE.

JAMES PRICE, OF EDGEFIELD DISTRICT, SOUTH CAROLINA, ASSIGNOR TO JOHN W. TOMPKINS AND STEPHEN S. TOMPKINS, EXECUTORS OF JAMES TOMPKINS, DECEASED, AND JOHN W. TOMPKINS, OF SAME PLACE.

IMPROVEMENT IN TANNING.

Specification forming part of Letters Patent No. 50,662, dated October 24, 1865.

*To all whom it may concern:*

Be it known that I, JAMES PRICE, of the District of Edgefield and State of South Carolina, have discovered a new and Improved Process of Tanning Hides and Skins, by which they may be converted into leather in a much shorter time and less expense than by any other process heretofore known or used; and I do declare that the following is a full, clear, and exact description of the process which I claim to have discovered.

I claim the use of the pine-leaf, either green or cured, separately or in combination with oak or hemlock bark, or any other substance containing tannin in any degree. I have experimented with pine-leaf, both in the green and cured states and in combination with oak-barks, and find that much time and expense is saved in the converting hides and skins into leather by the use of this leaf.

The leaves may be taken in the green state from the trees and put in a vat of water; then turn steam into the vat until the liquor produced will bear 20° of the liquor-gage.

The leaves may be ground by a mill or used without breaking; or they may be cured and used in the same manner, even in cold water; but the steam is used because it facilitates the extracting of the tannin. The liquor is then put in the vats for receiving the hides, which have been prepared in the usual manner, after which I claim no improvement in the method of handling them.

The hides and skins will be converted into leather in from one to five weeks, according to thickness.

What I claim to be new, and desire to secure by Letters Patent, is—

The use of the pine-leaf in the form of a watery extract or decoction in the process of tanning, either separately or combined with bark or other tanning material, in the manner described, and for the purpose specified.

JAMES PRICE.

Witnesses:
JOHN E. BACON,
A. J. HUGHES.